United States Patent [19]

Tucker et al.

[11] Patent Number: 4,635,613
[45] Date of Patent: Jan. 13, 1987

[54] LID SUPPORT FOR CART-MOUNTED OUTDOOR GRILL

[75] Inventors: James E. Tucker, Batavia; James C. Stephen, Arlington Heights; John Beecher, III, Carpentersville, all of Ill.

[73] Assignee: Weber-Stephen Products Co., Palatine, Ill.

[21] Appl. No.: 763,857

[22] Filed: Aug. 8, 1985

[51] Int. Cl.⁴ ............................................. A47J 37/00
[52] U.S. Cl. .................... 126/25 R; 126/30; 126/41 R; 220/379; 220/85 CH
[58] Field of Search ............... 126/39 B, 37 B, 41 R, 126/25 R, 25 C, 9 R, 30; 220/379, 85 CH; 248/311.2

[56] References Cited

U.S. PATENT DOCUMENTS

| D. 185,035 | 4/1959 | Murdoch | 126/25 RX |
| 2,094,915 | 10/1937 | Dawson | 126/25 R |
| 2,530,166 | 11/1950 | Johannsen | 126/25 R |
| 2,787,995 | 4/1957 | Alter | 126/25 R |
| 3,124,057 | 3/1964 | Kiser | 126/9 R |
| 3,379,190 | 4/1968 | Leach | 126/25 R |
| 3,611,915 | 10/1971 | Glaser et al. | 126/25 R |
| 3,785,275 | 1/1974 | Keats et al. | 126/25 R |
| 4,210,118 | 7/1980 | Dawn et al. | 126/25 R |
| 4,362,093 | 12/1982 | Griscom | 126/25 R |
| 4,453,530 | 6/1984 | Schlosser | 126/25 R |
| 4,523,574 | 6/1985 | Schlosser | 126/25 R |
| 4,535,749 | 8/1985 | Schlosser et al. | 126/9 R |

Primary Examiner—Samuel Scott
Assistant Examiner—H. A. Odar
Attorney, Agent, or Firm—Robert E. Wagner; Ralph R. Rath

[57] ABSTRACT

A portable outdoor grill including a hemispherical bowl and a hemispherical lid with the bowl having outwardly-directed flanges supported on spaced side members of a cart. The side members have lid-supporting clips adjacent the bowl that support the lid in an upright position adjacent the bowl. The clips are held on the side members for limited longitudinal movement by offset ends on an article-support surface to be assemblable without the use of tools.

16 Claims, 5 Drawing Figures

U.S. Patent   Jan. 13, 1987   4,635,613
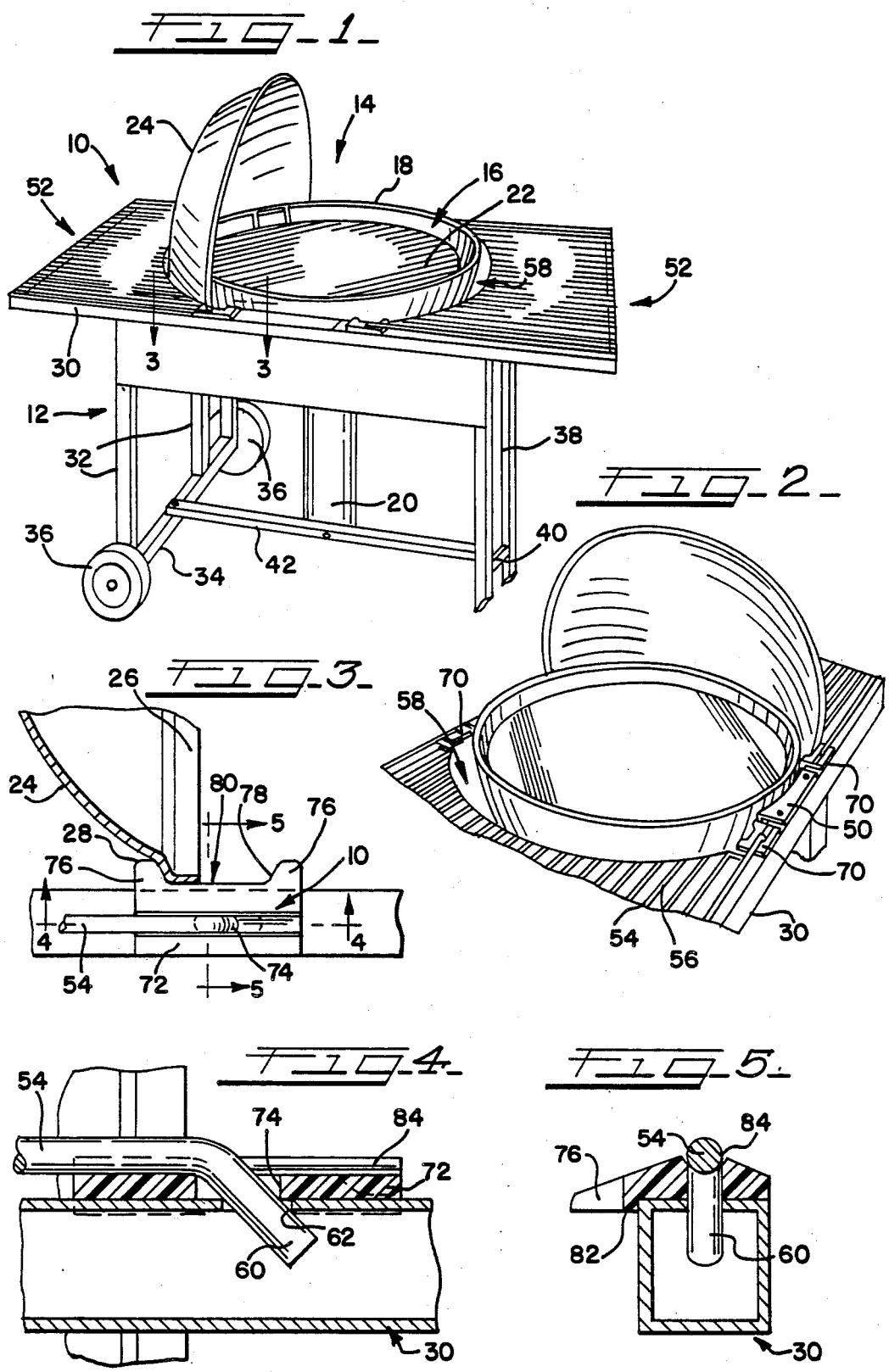

LID SUPPORT FOR CART-MOUNTED OUTDOOR GRILL

DESCRIPTION

1. Technical Field

The present invention relates generally to outdoor cooking devices and, more particularly, to cart-mounted barbecue grills.

2. Background Prior Art

Cooking devices for outdoor cooking have been in existence for a number of years. One of the most popular types of cooking devices that is presently being marketed by the Assignee of the present invention is commonly referred to as a "barbecue kettle". This cooking device consists of a generally hemispherical bowl that has a circular open top with a cooking surface located slightly below the upper edge or rim of the bowl. The bowl is supported on some type of structure consisting of either a tripod leg arrangement or a center post arrangement and has a cover or lid for enclosing the cooking surface. The bowl and cover both have vent openings so that cooking can be done while the cover is closed.

One type of barbecue kettle that is being marketed by the Assignee of the present invention is a charcoal cooker consisting of a bowl and cover with the bowl supported on a tripod leg arrangement and having a charcoal-supporting grid located in the lower part of the bowl. Another type of grill that is marketed by the Assignee of this invention consists of a bowl having a gas burner assembly located in the lower end and supported on a center depending post.

In an effort to provide adequate work surface area around the grill, various types of carts have been proposed that define the work surface surrounding the kettle and also provide a storage area for essential components normally used in the cooking process.

Many times it is desirable to have the cover or lid partially shield the cooking surface or grid, such as for outdoor cooking in extremely high windy conditions. Various mechanisms have been proposed for providing a work surface around a circular grill and also for providing shielding devices for shielding the cooking surface. However, manufacturers are constantly striving for obtaining a better unit which is attractive in appearance and also is functionally-desirable.

SUMMARY OF THE INVENTION

According to the present invention, a generally circular outdoor portable grill has a rectangular cart associated therewith which is designed to provide a working surface around and adjacent the grill and also provide a novel support structure for the cover or lid that forms part of the grill.

The cart consists of a pair of spaced side members supported on depending legs and at least two legs at one end of the cart have wheels supported thereon so that the unit can be lifted at the opposite end and moved to the desired location.

The generally hemispherical bowl has diametrically-opposed, outwardly-extending flanges which rest on the side members intermediate opposite ends thereof to support the bowl on the cart. The side members are preferably hollow, rectangular or square members that define an upper surface on which the flanges of the hemispherical bowl are supported.

According to one aspect of the invention, first and second substantially identical surfaces are provided on opposite ends of the spaced side members and each work or article-supporting surface consists of a plurality of spaced rods having an inner end that is generally arcuate in plan view and defines a slot adjacent the periphery of the bowl. The two side rods on opposite sides of the article-supporting surface have offset portions adjacent the inner end on opposite sides of the arcuate portion and the side members have openings for receiving the offset portions so that the working surface can easily be assembled simply by manipulation of the work surface with respect to the side members.

According to a further aspect of the invention, the cart also has lid-support means in the form of a non-metallic element that is supported on each of the side members and is retained thereon by the offset portions of the work surfaces so that the lid or cover can be supported in a generally vertical position in the slot between either of the inner ends of the respective work-supporting surfaces and the periphery of the bowl. The lid-support means consists of a pair of substantially identical clips that are supported on the side members at opposite ends of each arcuate slot that receives the lid. The clips or glides are elongated elements which have an elongated slot at the center and are retained on the side members by the offset portions of the working surfaces with the slots providing limited longitudinal movement of the clip with respect to the side members. Each clip has a pair of inwardly-directed projections at opposite ends, which conform generally to the configuration of the periphery of the lid and has a downwardly-directed lip along the inner edge between the spaced projections which is in engagement with the inner surface of the rectangular side members. The clips are formed of non-metallic material to protect the porcelain coating on the bowl from being chipped during use.

Each clip or glide also has a longitudinal groove extending from the upper surface and aligned with the elongated slot and the groove receives the wire rod that define opposite sides of each work-supporting surface. Thus, the units can be assembled without the use of any tools and the working surfaces can easily be removed for cleaning and replaced with minimum effort.

BRIEF DESCRIPTION OF SEVERAL VIEWS OF DRAWINGS

FIG. 1 is a perspective view of the outdoor grill constructed in accordance with the teachings of the present invention;

FIG. 2 is a fragmentary perspective view showing the cover in a shielding position on one side of the cooking or hemispherical bowl;

FIG. 3 is a fragmentary cross-sectional view as viewed along line 3—3 of FIG. 1;

FIG. 4 is a cross-sectional view as viewed along line 4—4 of FIG. 3; and,

FIG. 5 is a cross-sectional view as viewed along line 5—5 of FIG. 3.

DETAILED DESCRIPTION

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated.

FIG. 1 of the drawings shows an outdoor cooking vessel, generally designated by reference numeral 10, consisting of a cart 12 and a gas kettle, generally designated by reference numeral 14. The gas kettle consists of a lower hemispherical circular bowl 16 that has an upper peripheral rim 18 and a lower depending support post 20. The grill has a cooking grid 22 supported adjacent the upper surface and a gas burner unit (not shown) located below the cooking grid 22. A lid or cover 24 is adapted to close the bowl 16 and has a peripheral annular flange 26 which merges with the generally hemispherical main body portion of the cover through an annular inclined wall portion 28. The annular flange 26 is dimensioned to fit snugly around the rim 18 so that a substantially air-tight seal is developed between the bowl 16 and the lid 24. The bowl and cover are preferably formed from porcelain-coated enamel. The unit so far described is what is known as a "post-mounted gas grill", that is sold by the Assignee of the present invention.

According to the present invention, a novel rectangular cart 12 is designed to support the gas grill 14 and provide working surfaces on opposite sides of the grill, as well as a lid support which supports the lid in a shielding position for the cooking grid 22. The cart 12 includes a pair of spaced side members 30 that are interconnected at opposite ends by cross-members (not shown). The parallel side members 30 are preferably rectangular or square hollow tubes, as shown in FIG. 5, and are supported on a plurality of legs. In FIG. 1, a pair of rear legs 32 depend from the respective side members 30 and have a lower interconneccting cross-member 34 at the lower end thereof. The cross-member has wheels 36 supported at opposite ends thereof. A further set of depending legs 38 extend downwardly adjacent the opposite end and are again connected by a cross-member 40 at the bottom thereof. A further intermediate supporting brace 42 extends between the cross-members 34 and 40 and is offset to one side of the center of the cart so that the post 20 can be secured to the brace 42.

According to a primary aspect of the invention, the conventional circular grill 14 is supported on the side members 30 by a pair of integral flanges 50 that extend from the periphery at diametrically-opposed points adjacent the rim 18. These flanges rest directly on the side members 30, as shown in FIG. 2, and support the grill between opposite ends of the member.

According to one aspect of the invention, the cart 12 also has a pair of work-supporting surfaces located adjacent opposite ends of the respective side members 30. These work- or article-supporting surfaces are designed that they can be assembled onto the side members without the use of any special tools and can easily be removed for cleaning. The work-supporting surfaces also define retainers for a lid-support means, that will be described later.

Thus, as illustrated in FIGS. 2 and 4, the work-supporting surfaces 52 are identical in construction and are each formed from a plurality of circular rods 54 that are transversely spaced from each other and define a grid. The outer ends of the rods are connected by a linear rod (not shown) that is welded to the underside of the rods 54. The inner ends of the rods 54 are interconnected by an arcuate rod 56 that is spaced from the periphery of the bowl by a common dimension to define a generally arcuate slot 58, for a purpose that will be described later.

The ends of the two rods 54 that define opposite sides of the article-supporting surface 52 have offset end portions 60 which are received into the openings 62 that are defined on the side members 30, as shown in FIG. 4. Thus, the two article-supporting or work surfaces 52 can easily be dropped into position by aligning the offset portions 60 with the openings 62. Also, the working surfaces can be readily removed for cleaning and can be re-positioned very conveniently without the use of any special tools.

According to a further aspect of the invention, the article-supporting surfaces 52, particularly the offsets 60, are utilized for retaining lid-support means on the side members 30. The lid-support means are located at opposite ends of the arcuate slot 58. The lid-support means comprise a plurality of identical clips or glides 70 that are formed from a plastic material, such as nylon, and two clips on the respective side members 30 define a single lid-support means. Preferably, two sets of such clips are supported adjacent the inner ends of the respective article-supporting surfaces 52 so that the lid can be supported on opposite sides of the bowl 16, as illustrated respectively in FIGS. 1 and 2.

Each clip or glide 70 comprises a substantially rectangular elongated body 72 that has an elongated slot or opening 74 formed intermediate opposite ends thereof. The elongated opening receives the offset portion 60 of a side rod 54, as illustrated in FIGS. 3 and 4. The main body 72 has a pair of inwardly-directed projections 76 at opposite ends thereof and the projections 76 have an inner inclined wall portion 78. The projections define a slot 80 and the inclined wall portions 78 conform generally to the inclined portion 28 of lid or cover 24. The clip also has a downwardly-directed lip 82 that defines the inner edge of slot 80. In addition, the clip 70 has an arcuate upwardly-opening groove 84 in the upper surface which is aligned with the elongated slot 74.

The lid-support means and the article-supporting surfaces are assembled in the following manner. A pair of clips or glides 70 are positioned on the respective side members 30 adjacent opposite ends of arcuate slot 58 with the inner surface of lips 82 abutting the inner surfaces of the side members and the slots 74 aligned with the openings 62. An article-supporting surface 52 is then manipulated into position so that offsets 62 are received through the slots 74 into the openings 62. In the assembled position illustrated, the opposite side member rods 54 rest in the grooves 84 and limit the clip or glide to longitudinal movement on the side member 30. In this respect, it should be noted that the outer linear connecting rod can be dimensioned equal to the thickness of the main body 72 so that the article-supporting surface extends parallel to the side members.

The cart is dimensioned so that the transverse spacing between a pair of clips 70 that define a lid-support means is less than the diameter of the annular flange 26 of the lid 24. Thus, when the lid 24 is in the position illustrated in FIG. 1, the flange 26 is wedged into the slots 80 of clips 70 and the inclined wall portion 28 is located adjacent an inclined inner surface 78. The elongated slot or opening 74 will accommodate slight longitudinal movement of the clips with respect to the side members to accommodate misalignment of the lid in the slot 58.

In the supporting position illustrated in FIGS. 1 or 2, the lid is held in an upright position to shield the cooking grid or surface 22 from wind. In this position, the lid engages the inner surfaces of the downwardly-directed lips to prevent direct contact with the metal side members which need not necessarily be hollow rectangular tubes.

It will be appreciated that the lid-support means and article-support surface of the present invention are easy to manufacture at minimum cost and can easily be assembled by the purchaser without the use of any tools. Of course, while two identical lid-support means and article-support surfaces are illustrated, only one is necessary for the practice of the invention. Also, the lid-support means could be used without the article-support surface, and vice versa.

While a gas grill has been illustrated, the invention applies equally as well to a circular charcoal or electric grill.

We claim:

1. A portable outdoor grill including a generally hemispherical bowl having an upper peripheral rim and a hemispherical lid having a lower peripheral flange adapted to be received over said rim, a cart for supporting said bowl, said cart including spaced side members and said bowl having extensions extending from the periphery thereof and supported on said side members, clips carried by the respective side members, said clips having inwardly-directed projections adjacent respective ends for receiving said lower peripheral flange of said lid therebetween so that said lid is supported in a generally upright position by said clips adjacent said bowl.

2. A grill as defined in claim 1, further including an article-supporting surface supported on said side members adjacent said bowl, said article-supporting surface including a pair of rods on opposite sides supported on said side members, said rods having offset end portions adjacent said bowl and said side members having openings receiving said offset end portions so that said article-supporting surface is readily removable.

3. A grill as defined in claim 2, in which said clips have elongated slots, and said offset end portions are located in said slots to retain said clips on said side members.

4. A grill as defined in claim 3, in which said clips have elongated grooves aligned with said slots for receiving portions of said rods adjacent said offset end portions.

5. A portable outdoor grill comprising a generally rectangular cart having spaced side members and depending legs, a generally circular bowl having opposed, outwardly-directed flanges respectively supported on said side members and a lid for covering said bowl, an article-supporting surface supported on said side members, said article-supporting surface having an arcuate inner end adjacent said bowl and defining an arcuate slot for receiving said lid, said article-supporting surface having rods defining opposite sides and said rods having offset inner end portions and said side members having openings receiving said end portions so that said article-supporting surface can be dropped into position on said side members and retained on said side members by said offset inner end portions.

6. A grill as defined in claim 5, further including lid-support means on said side members at opposite ends of said arcuate slot.

7. A grill as defined in claim 6, in which said lid-support means includes a plurality of elongated clips supported on said side members, each clips having inwardly-directed projections on opposite ends and defining a space for receiving a lower peripheral flange of said lid.

8. A grill as defined in claim 7, in which each clip has an elongated slot with an offset inner end portion received through said slot for accommodating limited longitudinal movement of said clip on said side member.

9. A grill as defined in claim 8, in which each clip has a longitudinal groove aligned with said slot for receiving an inner end portion of a rod.

10. A grill as defined in claim 9, in which each clip is formed from a non-metallic material and has an inner downwardly-directed lip engaging said side member.

11. A portable outdoor grill comprising a rectangular cart having spaced parallel side members and depending legs, a generally circular bowl having diametrically-opposed outwardly-directed flanges respectively supported on said side members and a lid for covering said bowl, an article-supporting surface having an arcuate inner end adjacent said bowl defining an arcuate slot for said lid, connecting means on inner ends of opposite sides of said article-supporting surface for connecting said article-supporting surface to respective side members, and lid-support clips on respective side members at opposite ends of said arcuate slot and connected to said side members by said connecting means.

12. A portable outdoor grill as defined in claim 11, in which opposite sides of said article-supporting surface include rods and said rods have offset inner end portions defining said connecting means and in which said side members and lid-support clips have openings receiving said end portions.

13. A portable outdoor grill as defined in claim 12, in which said openings in said clips are elongated along said side members to accommodate limited longitudinal movement thereon.

14. A portable outdoor grill as defined in claim 13, in which said side members are rectangular and said clips have inner downwardly-directed lips engaging said side members to prevent direct contact between said lid and said side members.

15. A portable outdoor grill as defined in claim 13, in which said clips have upwardly-opening grooves aligned with said elongated openings for receiving inner ends of said rods.

16. A portable outdoor grill as defined in claim 11, in which said bowl has a depending center post and in which said cart has a lower intermediate supporting brace with said post secured to said brace.

* * * * *